April 10, 1962 EIJIRO TAKAGISHI 3,028,756
RESISTANCE NETWORKS WITH THERMISTORS
Filed July 26, 1960 measuring instrument and electrical source resistor network deviation of thermistor resistance deviation of thermistor resistance INVENTOR:
EIJIRO TAKAGISHI
BY
Richardson, David and Nordon
Att'ys.

United States Patent Office 3,028,756
Patented Apr. 10, 1962

3,028,756
RESISTANCE NETWORKS WITH THERMISTORS
Eijiro Takagishi, 893 Kamikitazawa 3-chome,
Setagaya-ku, Tokyo, Japan
Filed July 26, 1960, Ser. No. 45,372
4 Claims. (Cl. 73—362)

This invention relates to a resistance network with thermistor and particularly to a system for providing substantially definite temperature-resistance characteristics of a resistance network including a thermistor and a measuring instrument, irrespective of substantial deviation of the thermistor from its rated resistance value.

In the contemporary art of thermistor manufacture, it is substantially impossible to keep deviations of resistance values of thermistors within say ±1% in large scale production.

Even with ±1% deviations or so, it is substantially impossible to provide substantially definite temperature-resistance characteristics of a resistance network including a thermistor, irrespective of change in its deviation. That is, the thermistor of a particular network can not have interchangeability. Consequently, when the thermistor of a particular resistance network associated with a measuring instrument, such as a precision thermometer, wind velocity meter, temperature regulating apparatus, etc., is spoiled and a new one should be used in place of the former, it is necessary for the user to send the whole apparatus including the measuring instrument to the factory where the whole apparatus should be re-assembled and re-adjusted or recalibrated in order to obtain an acceptable measuring, regulating or similar apparatus.

There is, in addition, an inherent obstruction to a large scale production of apparatus utilizing thermistors, because every apparatus should individually be adjusted and calibrated, and standardization is impossible even for the measuring instruments.

It is an object of the present invention to provide substantially definite temperature-resistance characteristics of a resistance network including a thermistor and a measuring instrument, irrespective of deviation of the thermistor, and consequently to enable to standardize the measuring instrument included in the network.

Another object of the present invention is to provide a system for determining values of resistors constituting a network including a thermistor as well as a measuring instrument so that the thermistor deviation are compensated for, or the network may have definite temperature-resistance characteristics irrespective of deviation of the thermistor at three spaced definite points of different temperatures. If a characteristic curve passes three spaced definite points of different temperatures, it is substantially definite over the corresponding temperature range.

Another object of the present invention is to provide thermistor probes that may consistently be associated with and operate in a proper manner for one and the same measuring instrument, irrespective of deviations of thermistors employed in the probes.

Other objects and particularities of the present invention will be made obvious from the following description of the constructional features of the present invention given with reference to the accompanying drawings, wherein.

Figure 1:
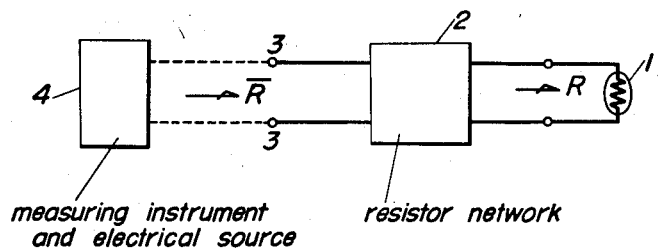
FIG. 1 is a block diagram representing the present invention.

Referring to FIG. 1, the present invention comprises a thermistor 1, a resistor network 2 having a pair of terminals 3, and a measuring instrument with electrical source 4 connected across the terminals 3. The thermistor 1, network 2 and measuring instrument with electrical source are connected together in cascade. According to the present invention, by formulating resistance values of respective resistors constituting the network 2 in a proper manner as hereinafter discussed in detail, the resultant resistance $\bar{R}$ of network 2 with thermistor 1 across terminals 3 can have definite values at three spaced definite points of different temperatures of thermistor 1, irrespective of deviations of the thermistor resistance from the rated value. In other words, resultant resistances $\bar{R}o$, $\bar{R}n$ and $\bar{R}m$, the values of $\bar{R}$ at temperatures $To$, $Tn$ and $Tm$, respectively, are fixed to respective predetermined values, in spite of changes in deviations of the thermistor resistance, where $To<Tn<Tm$. When three resultant resistances $\bar{R}o$, $\bar{R}n$ and $\bar{R}m$ are definite at three spaced definite points of temperatures $To$, $Tn$ and $Tm$, respectively, it is deemed that a temperature-resistance curve passing such three points simultaneously is substantially definite, or the temperature-resistance characteristics of the particular network is substantially definite irrespective of changes in deviations of the thermistor 1.

Figure 2:
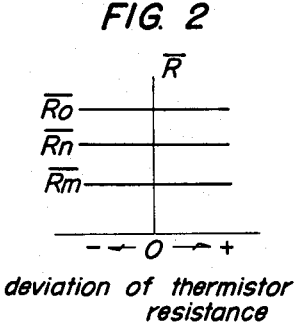
FIG. 2 shows conditions satisfied by the present invention.

It is known that the resultant resistance $\bar{R}o$ can readily be fixed to a definite value at a temperature $To$ irrespective of the resistance value $Ro$ of thermistor 1 at that temperature, by proper selection of parallel and series resistor elements forming the network 2. Curve $\bar{R}o$ in FIG. 2 illustrates such a condition. The number of possible combinations of resistor elements for satisfying such a condition is countless, and among them, one can readily choose a particular combination that satisfies another condition for fixing the resultant resistance $\bar{R}n$ at another temperature $Tn$ to another definite value, irrespective of the resistance value $Rn$ of thermistor 1 at that temperature, as shown by curve $\bar{R}n$ in FIG. 2.

It is not easy, however, to obtain a definite resistance value $\bar{R}m$ (FIG. 2) at the third temperature $Tm$ irrespective of the resistance value $Rm$ of thermistor 1 at temperature $Tm$ by use of the same resistor combination that satisfies the first and second conditions, without teaching of the present invention. As far as I know, there has been no proposal practised for accomplishing such a result.

Figure 3:
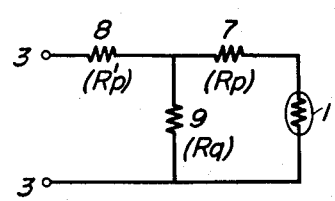
FIG. 3 is a circuit diagram of the resistor network with a thermistor.

The resistor network 2 may have various forms comprising parallel and series resistors. A T-type network is shown in FIG. 3 as an example. A so-called π-type network (not shown) is another example. While the present invention is explained below with reference to a T-type network shown in FIG. 3, it will be understood the principle disclosed thereby may readily be applied to a π-type network with necessary and apparent changes.

Referring to FIG. 3, the network 2 comprises a pair of series resistors 7 and 8, and a parallel resistor 9 which is connected across the thermistor 1 in series with resistor 7. The resistance values of these resistors are represented by $Rp$, $R'p$ and $Rq$, respectively. Then, we can have the following obvious equations at temperatures $To$, $Tn$ and $Tm$, respectively:

$$\frac{\bar{R}o}{Ro} = p' + \cfrac{1}{q + \cfrac{1}{p+1}} \quad (1)$$

$$\frac{\bar{R}n}{Ro} = p' + \frac{1}{q + \frac{1}{p + \frac{1}{\bar{S}n}}} = \frac{\bar{R}o}{Ro} \cdot \frac{1}{\bar{S}n} \quad (2)$$

$$\frac{\bar{R}m}{Ro} = p' + \frac{1}{q + \frac{1}{p + \frac{1}{\bar{S}m}}} = \frac{\bar{R}o}{Ro} \cdot \frac{1}{\bar{S}m} \quad (3)$$

Where $\bar{R}o$=resultant resistance at thermistor temperature $To$
$\bar{R}n$=resultant resistance at thermistor temperature $Tn$
$\bar{R}m$=resultant resistance at thermistor temperature $Tm$
$To < Tn < Tm$
$Ro$=thermistor resistance at temperature $To$
$Rn$=thermistor resistance at temperature $Tn$
$Rm$=thermistor resistance at temperature $Tm$
$p = Rp/Ro$
$p' = R'p/Ro$
$q = Ro/Rq$
$Sn = Ro/Rn (>1)$
$Sm = Ro/Rm (>Sn)$
$\bar{S}n = \bar{R}o/\bar{R}n$
$\bar{S}m = \bar{R}o/\bar{R}m$ We then obtain the following equations:

$$q = \sqrt{\frac{\bar{R}n}{Rn}} \cdot \frac{Sn}{\sqrt{v \cdot \bar{v}}} (u - \bar{u}) \quad (4)$$

$$1 + p = \frac{1}{Sn(u - \bar{u})} \left[ (Sn - 1)(1 - \bar{u}) - \sqrt{\frac{\bar{R}n}{Rn}} \cdot \sqrt{v \cdot \bar{v}} \right] \quad (5)$$

$$p' = \frac{1}{Sn(Sn-1)(u-\bar{u})} \cdot \sqrt{\frac{\bar{R}n}{Rn}} \left[ \sqrt{\frac{\bar{R}n}{Rn}} \cdot (u - \bar{x}) - \sqrt{v \cdot \bar{v}} \right] \quad (6)$$

where $$\bar{x} = \frac{\bar{S}n - 1}{\bar{S}m - 1} (<1)$$

$$\bar{u} = \frac{\bar{S}n}{\bar{S}m} \cdot \bar{x} (<1; >\bar{x})$$

$$\bar{v} = \bar{u} - \bar{x} (>0)$$

$$x = \frac{Sn - 1}{Sm - 1}$$

$$u = \frac{Sm}{Sn} \cdot x$$

$$v = u - x$$

If Equations 4, 5 and 6 are substituted in the right sides of Equations 1, 2 and 3, both sides of Equations 1, 2 and 3 become equal, respectively. Then, it is understood that, in order to obtain definite values of $\bar{R}o$, $\bar{R}n$ and $\bar{R}m$ at respective temperatures $To$, $Tn$ and $Tm$, irrespective of $Ro$, $Rn$ and $Rm$, the conditions represented by Equations 4, 5 and 6 must be satisfied simultaneously. Since $p$ and $p'$ must, of course, be positive real numbers, we know from Equations 5 and 6 that $$\frac{\bar{R}n}{Rn}$$

must satisfy the following condition:

$$\frac{v \cdot \bar{v}}{(u - \bar{x})^2} \leq \frac{\bar{R}n}{Rn} \leq \frac{(\bar{u} - x)^2}{v \cdot \bar{v}}$$

or $$Rn(N) \leq \bar{R}n \leq Rn(x) \quad (7)$$

Where $Rn(N)$ = the lower permissible limit of $\bar{R}n$ $$= \bar{R}n \cdot \frac{v \cdot \bar{v}}{(\bar{u} - x)^2}$$

$Rn(x)$ = the upper permissible limit of $\bar{R}n$ $$= \bar{R}n \cdot \frac{(u - \bar{x})^2}{v \cdot \bar{v}}$$

We may assume that a measure of the range within which the compensation of thermistor resistance deviations is properly obtained is $$\sqrt{\frac{Rn(x)}{Rn(N)}} \equiv \sqrt{\rho} \quad (8)$$

then $$\sqrt{\rho} = \frac{(u - \bar{x})(u - x)}{v \cdot \bar{v}} \quad (9)$$

or $$\sqrt{\rho} - 1 = \frac{(\bar{x} - x)(u - \bar{u})}{v \cdot \bar{v}} \quad (10)$$

In order to accomplish the required compensation, $\sqrt{\rho}$ must be larger than unity, and the following condition is established from Equations 9 and 10:

$$u > \bar{u} > \bar{x} > x \quad (11)$$

Thus, I have obtained the conditions for keeping $\bar{R}o$, $\bar{R}n$ and $\bar{R}m$ to respective definite values at three points of temperatures $To$, $Tn$ and $Tm$, respectively, irrespective of certain degrees of deviations of thermistor resistance from the rated values as follows:

(a) The functions of ratios of resultant resistances ($\bar{x}$ and $\bar{u}$) must satisfy the condition 11.

(b) The ratio of resultant resistance to thermistor resistance ($\bar{R}n/Rn$) must satisfy the condition 7.

In other words, I have found that, with a given thermistor, if $\bar{R}o$, $\bar{R}n$ and $\bar{R}m$ are determined optionally, the desired three point compensation cannot be accomplished at any precise adjustment of the resistor combination of network 2. According to the invention, the above-mentioned two conditions $a$ and $b$ are satisfied for the resultant resistances $\bar{R}o$, $\bar{R}n$ and $\bar{R}m$, and the desired three point compensation is obtained consistently.

Figure 4:
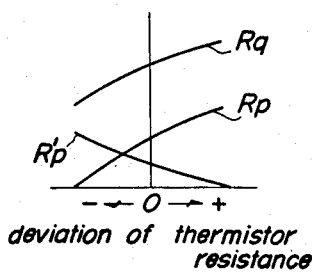
FIG. 4 shows values of resistors shown in FIG. 3 with reference to deviations of the thermistor resistance.

After the resultant resistances $\bar{R}o$, $\bar{R}n$ and $\bar{R}m$ at three points of temperatures $To$, $Tn$ and $Tm$ are determined as above-discussed, the respective resistances $Rp$, $R'p$ and $Rq$ of resistors 7, 8 and 9 are determined according to the deviation of the particular thermistor, from Equations 4, 5 and 6. A manner in which $Rp$, $R'p$ and $Rq$ must be changed in accordance with deviations of thermistor resistance is shown in FIG. 4.

The above-mentioned condition $a$ may more easily be understood by the explanation given below.

Let me establish the following definition: $F$=the ratio of the resultant resistance of network 2 across thermistor 1, when terminals 3 are short circuited, to $Ro$.

Then $$FRo = Rp + \frac{1}{\frac{1}{Rq} + \frac{1}{R'p}} = Ro \left[ p + \frac{1}{q + \frac{1}{p}} \right] \quad (12)$$

By substituting Equations 4, 5 and 6 in Equation 12, $$F = \frac{\bar{x} - x}{u - \bar{x}} \cdot \frac{1}{Sn} \quad (13)$$

then $$\frac{1}{1 + F} = \frac{u - \bar{x}}{v} \cdot \frac{1 - x}{1 - \bar{x}}$$

and $$\frac{1}{1+\overline{F}\overline{S}n} = \frac{u-\bar{x}}{v} \quad (14)$$

From Equations 9 and 10

$$\sqrt{\rho} - \frac{1}{1+\overline{F}} = \frac{u-\bar{x}}{v} \cdot \frac{\bar{x}-x}{\bar{v}} \cdot \frac{1-\bar{u}}{1-\bar{x}} \quad (15)$$

and $$\sqrt{\rho} - \frac{1}{1+\overline{F}\overline{S}n} = \frac{u-\bar{x}}{v} \cdot \frac{\bar{x}-x}{\bar{v}} \quad (16)$$

then $$\frac{\sqrt{\rho} - \frac{1}{1+\overline{F}\overline{S}n}}{\sqrt{\rho} - \frac{1}{1+\overline{F}}} = \frac{1-\bar{x}}{1-\bar{u}} = \overline{S}n \quad (17)$$

In the similar manner, I obtain $$\frac{\sqrt{\rho} - \frac{1}{1+\overline{F}\overline{S}m}}{\sqrt{\rho} - \frac{1}{1+\overline{F}}} = \overline{S}m \quad (18)$$

From Equations 17 and 18, it is obvious that $\overline{S}n$ and $\overline{S}m$ have maximum values, respectively, for a certain value of F. In other words, $\overline{S}n$ and $\overline{S}m$ have upper permissible values, respectively.

Figure 5:
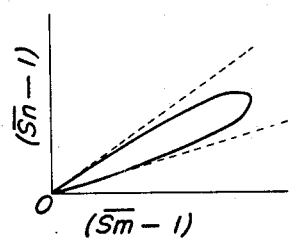
FIG. 5 shows a condition to be satisfied for embodying the present invention.

In addition, by eliminating F from Equations 17 and 18 for obtaining the relation between $(\overline{S}n-1)$ and $(\overline{S}m-1)$ with $\sqrt{\rho}$ as the parameter, I have obtained a closed loop curve as shown in FIG. 5. As $\sqrt{\rho}$ increases its value, the loop becomes smaller. It is then obvious that the desired three point compensation can be effected only within the area represented by the closed loop. In other words, the locus curve of FIG. 5 depicted by Equations 17 and 18 is a representation of the condition $a$ in another expression, and this explains the reason why the three point compensation has heretobefore been extremely difficult to be effected, though not impossible.

Next, I will give practical examples of apparatus embodying the present invention.

When thermistor 1 has a rated characteristic of $Ro=1.0$ kilo-ohm, $Rn=\frac{1}{2}$ kilo-ohm, and $$Rm = \frac{1}{3.5} \text{ kilo-ohm}$$

then $$x=0.40, \ u=0.70 \text{ and } v=0.30$$

According to the condition $a$, I select $$\bar{x}=0.60 (F=1.0)$$
$$\rho=1.05/0.95$$

Then, from Equations 9 and 10

$$\frac{\bar{u}}{u} = \frac{A}{1+\frac{B/A}{\frac{\bar{x}}{x} - \frac{1}{A}}} \quad (19)$$

where $$A = 1+(\sqrt{\rho}-1)\left(\frac{v}{u}\right)$$

$$B = (A-1)\frac{\sqrt{\rho}}{\left(\frac{u}{v}\right)-1}$$

From the above equation, I obtain $$\bar{u}=0.69285$$

This satisfies the condition $a$. By the definition, I obtain $$\bar{v}=0.09285$$

Then $$\frac{Rn(x)}{\overline{R}n} = 2.786$$

Since $Rn(x)=Rn \times 1.05 = 0.525$, I obtain $\overline{R}n=1.462$.
One of the three resultant resistances has thus been determined. From the definitions $$\overline{S}n = \frac{1-\bar{x}}{1-\bar{u}}$$

$$\overline{S}m = \overline{S}n \cdot \frac{\bar{u}}{\bar{x}}$$

Then $$\overline{S}n=1.302$$
$$\overline{S}m=1.504$$

From the definitions $$\overline{R}o = \overline{R}n \cdot \overline{S}n = 1.904$$
$$\overline{R}m = \overline{R}o/\overline{S}m = 1.266$$

Thus, all the three resultant resistances have been determined.

The values to be afforded to $p$, $p'$ and $q$ for obtaining these resultant resistance values are obtained by Equations 4, 5 and 6, thus $$q=0.05008, \ p=0.5188, \text{ and } p'=0.4928$$

when $Rn=0.50$ kilo-ohm. Consequently, $Rq=19.97$ kilo-ohm, $Rp=0.5188$ kilo-ohm, and $R'p=0.4928$ kilo-ohm.

In similar manners, values of $Rq$, $Rp$ and $R'p$ for thermistors having deviations from the rated values are obtained. Table I gives values of various elements thus obtained.

Table I

| | | | | |
|---|---|---|---|---|
| Thermistor Deviation (percent) | −0.05 | 0.00 | 0.02 | 0.05 |
| Ro (kilo-ohm) | 0.95 | 1.00 | 1.02 | 1.05 |
| Rn (kilo-ohm) | 0.475 | 0.500 | 0.510 | 0.525 |
| Rm (kilo-ohm) | 0.2714 | 0.2857 | 0.2914 | 0.300 |
| Sn | 2.0 | 2.0 | 2.0 | 2.0 |
| Sm | 3.5 | 3.5 | 3.5 | 3.5 |
| Rp (kilo-ohm) | 0.00 | 0.5188 | 0.7277 | 1.050 |
| R'p (kilo-ohm) | 0.9987 | 0.4928 | 0.2944 | 0.00 |
| Rq (kilo-ohm) | 19.46 | 19.97 | 20.17 | 20.46 |
| $\overline{R}o$ (kilo-ohm) | 1.904 | 1.904 | 1.904 | 1.904 |
| $\overline{R}n$ (kilo-ohm) | 1.462 | 1.462 | 1.462 | 1.462 |
| $\overline{R}m$ (kilo-ohm) | 1.266 | 1.266 | 1.266 | 1.266 |
| $\overline{S}n$ | 1.302 | 1.302 | 1.302 | 1.302 |
| $\overline{S}m$ | 1.504 | 1.504 | 1.504 | 1.504 |
| $\overline{R}o/Ro$ | 2.004 | 1.904 | 1.867 | 1.813 |

In the above table, the definite values of $\overline{R}o$, $\overline{R}n$, and $\overline{R}m$ have been verified by the following obvious equations:

$$\overline{R}o = R'p + \frac{1}{\frac{1}{Rq} + \frac{1}{Rp+Ro}}$$

$$\overline{R}n = R'p + \frac{1}{\frac{1}{Rq} + \frac{1}{Rq+Rn}}$$

$$\overline{R}m = R'p + \frac{1}{\frac{1}{Rq} + \frac{1}{Rp+Rm}}$$

If, not following the teaching of present invention, $\overline{S}n$ and $\overline{S}m$ would have been selected optionally, any as follows:

$$\overline{S}n=1.30 \text{ and } \overline{S}m=1.45$$

then $$\bar{u}=0.7436 > u$$

and it is impossible to accomplish the desired three point compensation at any elaborate work of adjustment of circuit constants, because the Equation 7 is not satisfied as shown below.

$$\frac{Rn(N)}{\overline{R}n} = 0.1957$$

$$\frac{Rn(x)}{\overline{R}n} = 0.04810$$

Thus, the upper permissible limit $Rn(x)$ of the $Rn$ should become smaller than the lower permissible limit $Rn(N)$, and this, of course, is impossible.

Another design example of the present invention is given in Table II for maximum permissible deviation of ±20% of thermistor resistance.

According to the Equation 11, $\overline{w}$ is selected to be 0.65, and then $\overline{u} = 0.6894$
$\overline{v} = 0.03938$
$\overline{S}n = 1.127$
$\overline{S}m = 1.195$
$\overline{R}o = 3.195$ kilo-ohm
$\overline{R}n = 2.836$ kilo-ohm
$\overline{R}m = 2.674$ kilo-ohm Table II

| Thermistor Deviation (Percent) | −0.20 | 0.00 | +0.20 |
|---|---|---|---|
| Ro (kilo-ohm) | 0.80 | 1.00 | 1.20 |
| Rn (kilo-ohm) | 0.400 | 0.500 | 0.600 |
| Rm (kilo-ohm) | 0.2286 | 0.2857 | 0.3429 |
| Sn | 2.00 | 2.00 | 2.00 |
| Sm | 3.50 | 3.50 | 3.50 |
| Rp (kilo-ohm) | 0.00 | 1.439 | 3.000 |
| R'p (kilo-ohm) | 2.451 | 1.163 | 0.00 |
| Rq (kilo-ohm) | 10.90 | 12.185 | 13.35 |
| $\overline{R}o$ (kilo-ohm) | 3.195 | 3.195 | 3.195 |
| $\overline{R}n$ (kilo-ohm) | 2.835 | 2.835 | 2.835 |
| $\overline{R}m$ (kilo-ohm) | 2.674 | 2.674 | 2.674 |
| $\overline{S}n$ | 1.127 | 1.127 | 1.127 |
| $\overline{S}m$ | 1.195 | 1.195 | 1.195 |
| $\overline{R}o/Ro$ | 3.994 | 3.195 | 2.663 |

From the foregoing disclosures, it has been understood that the present invention provides a combination of a thermistor 1 and a resistor network 2 to be connected to a measuring instrument with energy source in cascade, in which the resistances $Ro$, $Rn$ and $Rm$ of the thermistor at three different temperatures $To$, $Tn$ and $Tm$, respectively, where $To < Tn < Tm$, and the corresponding resultant resistances $\overline{R}o$, $\overline{R}n$ and $\overline{R}m$ are so co-related that the resistance ratio functions $\overline{w}$ and $\overline{u}$ satisfy the Equation 11, while the ratio $\overline{R}n/Rn$ of resultant resistance to thermistor resistance at one temperature $Tn$ satisfies the Equation 7, whereby the resultant resistances $\overline{R}o$, $\overline{R}n$ and $\overline{R}m$ can be maintained constant at the respective temperatures, in spite of certain deviations of the thermistor resistances, provided that the resistor elements of network 2 are selected or adjusted in proper manners in accordance with the thermistor deviations. By this, thermistors are made interchangeable without necessity of re-adjustment of associated measuring instruments, and a way to large scale production has been open for apparatus utilizing thermistors.

I claim as my invention:

1. In combination, a resistor network including series and parallel resistors and a thermistor, in which (a) the resistance values $Ro$, $Rn$ and $Rm$ of said thermistor at temperatures $To$, $Tn$ and $Tm$, respectively, where $$To < Tn < Tm$$

and the corresponding resultant resistances $\overline{R}o$, $\overline{R}n$ and $\overline{R}m$ of said network with said thermistor have ratio values of substantially the following relations:

$$u > \overline{u} > \overline{w} > x$$

where $$\overline{x} = \frac{\overline{S}n - 1}{\overline{S}m - 1}$$

$\overline{S}n = \overline{R}o/\overline{R}n (>1)$ $\overline{S}m = \overline{R}o/\overline{R}m (>\overline{S}n)$ $$x = \frac{Sn - 1}{Sm - 1}$$

$Sn = Ro/Rn (>1)$ $Sm = Ro/Rm (>Sn)$ $$\overline{u} = \frac{\overline{S}m}{\overline{S}n} \cdot \overline{x} (>\overline{x})$$

$$u = \frac{Sm}{Sn} \cdot x (>x)$$

and (b) the ratio value ($\overline{R}n/Rn$) of said resultant resistance to said thermistor resistance at one of said temperatures, $Tn$, satisfies the following condition:

$$\frac{v \cdot \overline{v}}{(u-x)^2} \leq \frac{\overline{R}n}{Rn} \leq \frac{(u-x)^2}{v \cdot \overline{v}}$$

where $v = u - x$ $\overline{v} = \overline{u} - \overline{w}$

2. The combination according to claim 1, in which said resistor network comprises series and parallel resistances $Rp$, $R'p$ and $Rq$, and has substantially definite resultant resistances $\overline{R}o$, $\overline{R}n$ and $\overline{R}m$ at said temperatures $To$, $Tn$ and $Tm$, respectively, said resistances $Rp$, $R'p$ and $Rq$ being represented by substantially the following formulae:

$$\frac{\overline{R}o}{Ro} = p' + \frac{1}{q + \frac{1}{p+1}}$$

$$\frac{\overline{R}n}{Ro} = \frac{\overline{R}o}{Ro} \cdot \frac{1}{\overline{S}n}$$

$$\frac{\overline{R}m}{Ro} = \frac{\overline{R}o}{Ro} \cdot \frac{1}{\overline{S}m}$$

where $p = Rp/Ro > 0$ $p' = R'p/Ro > 0$ $q = Ro/Rq$

3. A resistance network with thermistor, comprising a thermistor having resistance values $Ro$, $Rn$ and $Rm$ at temperatures $To$, $Tn$ and $Tm$, respectively, where $$To < Tn < Tm$$

and a resistor network having together with said thermistor different and definite resultant resistance values $\overline{R}o$, $\overline{R}n$ and $\overline{R}m$ at said temperatures $To$, $Tn$ and $Tm$, respectively, irrespective of the deviation of said thermistor from its rated values of resistances, said resistor network comprising resistances $Rp$, $R'p$ and $Rq$ connected in series and parallel with said thermistor, and represented by substantially the following formulae:

$$\frac{\overline{R}o}{Ro} = p' + \frac{1}{q + \frac{1}{p+1}}$$

$$\frac{\overline{R}n}{Ro} = \frac{\overline{R}o}{Ro} \cdot \frac{1}{\overline{S}n}$$

$$\frac{\overline{R}m}{Ro} = \frac{\overline{R}o}{Ro} \cdot \frac{1}{\overline{S}m}$$

where $$p = R_p/R_o > 0$$
$$p' = R'_p/R_o > 0$$
$$q = R_o/R_q$$
$$\bar{S}n = \bar{R}_o/\bar{R}_n$$
$$\bar{S}m = \bar{R}_o/\bar{R}_m$$

4. In combination, a resistor network including series and parallel resistors and a thermistor, with a measuring instrument and energy source connected in cascade, in which (a) the resistance values $R_o$, $R_n$ and $R_m$ of said thermistor at temperatures $T_o$, $T_n$ and $T_m$, respectively, where $T_o < T_n < T_m$, and the corresponding resultant resistances $\bar{R}_o$, $\bar{R}_n$ and $\bar{R}_m$ of said network with said thermistor have ratio values of substantially the following relations:

$$u > \bar{u} > \bar{x} > x$$

where $$\bar{x} = \frac{\bar{S}n - 1}{\bar{S}m - 1}$$
$$\bar{S}n = \bar{R}_o/\bar{R}_n \,(>1)$$
$$\bar{S}m = \bar{R}_o/\bar{R}_m \,(>\bar{S}n)$$
$$x = \frac{Sn - 1}{Sm - 1}$$
$$Sn = R_o/R_n \,(>1)$$
$$Sm = R_o/R_m \,(>Sn)$$
$$\bar{u} = \frac{\bar{S}m}{\bar{S}n} \cdot \bar{x} \,(>\bar{x})$$
$$u = \frac{Sm}{Sn} \cdot x \,(>x)$$

and (b) the ratio value ($\bar{R}_n/R_n$) of said resultant resistance to said thermistor resistance at one of said temperatures, $T_n$, satisfies the following condition:

$$\frac{v \cdot \bar{v}}{(u - \bar{x})^2} \leq \frac{\bar{R}_n}{R_n} \leq \frac{(\bar{u} - x)^2}{v \cdot \bar{v}}$$

where $$v = u - x$$
$$\bar{v} = \bar{u} - \bar{x}$$

References Cited in the file of this patent

UNITED STATES PATENTS

| | | |
|---|---|---|
| 2,086,910 | Hansell | July 13, 1937 |
| 2,567,755 | Amsler | Sept. 11, 1951 |
| 2,567,756 | Amsler | Sept. 11, 1951 |